United States Patent
Graf

(10) Patent No.: US 6,323,564 B1
(45) Date of Patent: Nov. 27, 2001

(54) CIRCUIT CONFIGURATION WITH REDUCED EMI

(75) Inventor: Alfons Graf, Kaufering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/869,099

(22) Filed: Jun. 4, 1997

(30) Foreign Application Priority Data

Jun. 4, 1996 (DE) .............................................. 196 22 417

(51) Int. Cl.$^7$ ........................................................ H02M 1/12
(52) U.S. Cl. .............................. 307/10.1; 307/89; 307/91; 180/167; 315/85; 361/159
(58) Field of Search ............................... 307/10.1, 89, 91; 363/44, 39, 40, 97; 323/290; 301/818, 159; 318/492; 180/167; 315/338, 85

(56) References Cited

U.S. PATENT DOCUMENTS

| | | | |
|---|---|---|---|
| 4,730,243 | * 3/1988 | Glennon | 363/44 |
| 5,148,358 | 9/1992 | Estes, Jr. | |
| 5,661,390 | * 8/1997 | Lipo et al. | 318/492 |
| 5,757,628 | * 5/1998 | Kamata | 363/97 |
| 5,789,723 | * 8/1998 | Hirst | 323/290 |

FOREIGN PATENT DOCUMENTS

| | | |
|---|---|---|
| 34 20 535 C2 | 12/1985 | (DE) . |
| 89/01260 | 2/1989 | (WO) . |

* cited by examiner

*Primary Examiner*—Albert W. Paladini
(74) *Attorney, Agent, or Firm*—Herbert L. Lerner; Laurence A. Greenberg; Werner H. Stemer

(57) ABSTRACT

A circuit configuration with reduced EMC radiation in a motor vehicle includes a semiconductor switch with a load section which is connected, on one hand, through a first supply line to a positive battery terminal and, on the other hand, through a second supply line to a load and a freewheeling diode. A device for pulse-width modulation controls the semiconductor switch. The semiconductor switch and the freewheeling diode are disposed as close as possible to the battery terminal, so that supply leads from the battery to the semiconductor switch and the freewheeling diode are shortened.

4 Claims, 2 Drawing Sheets

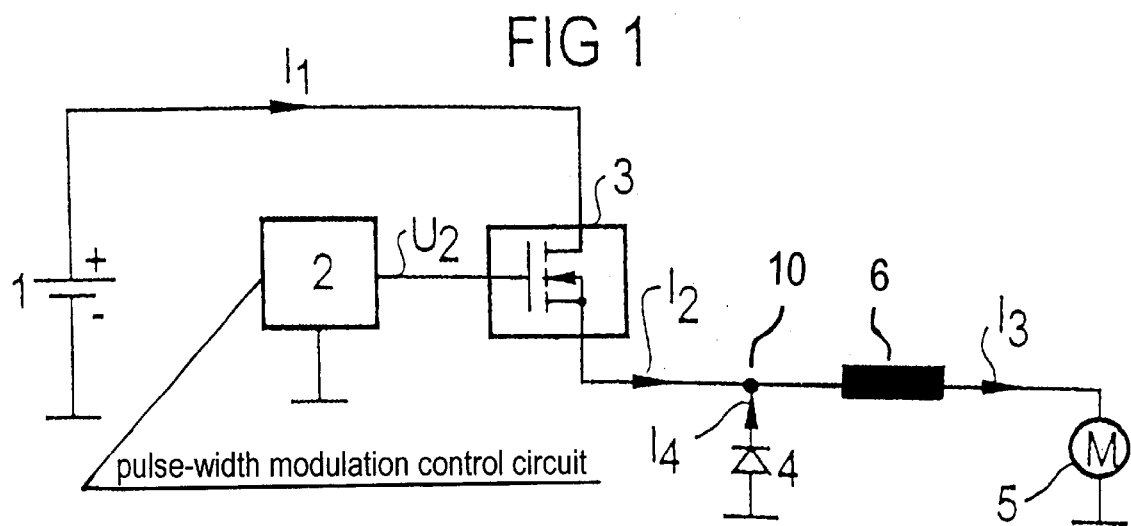

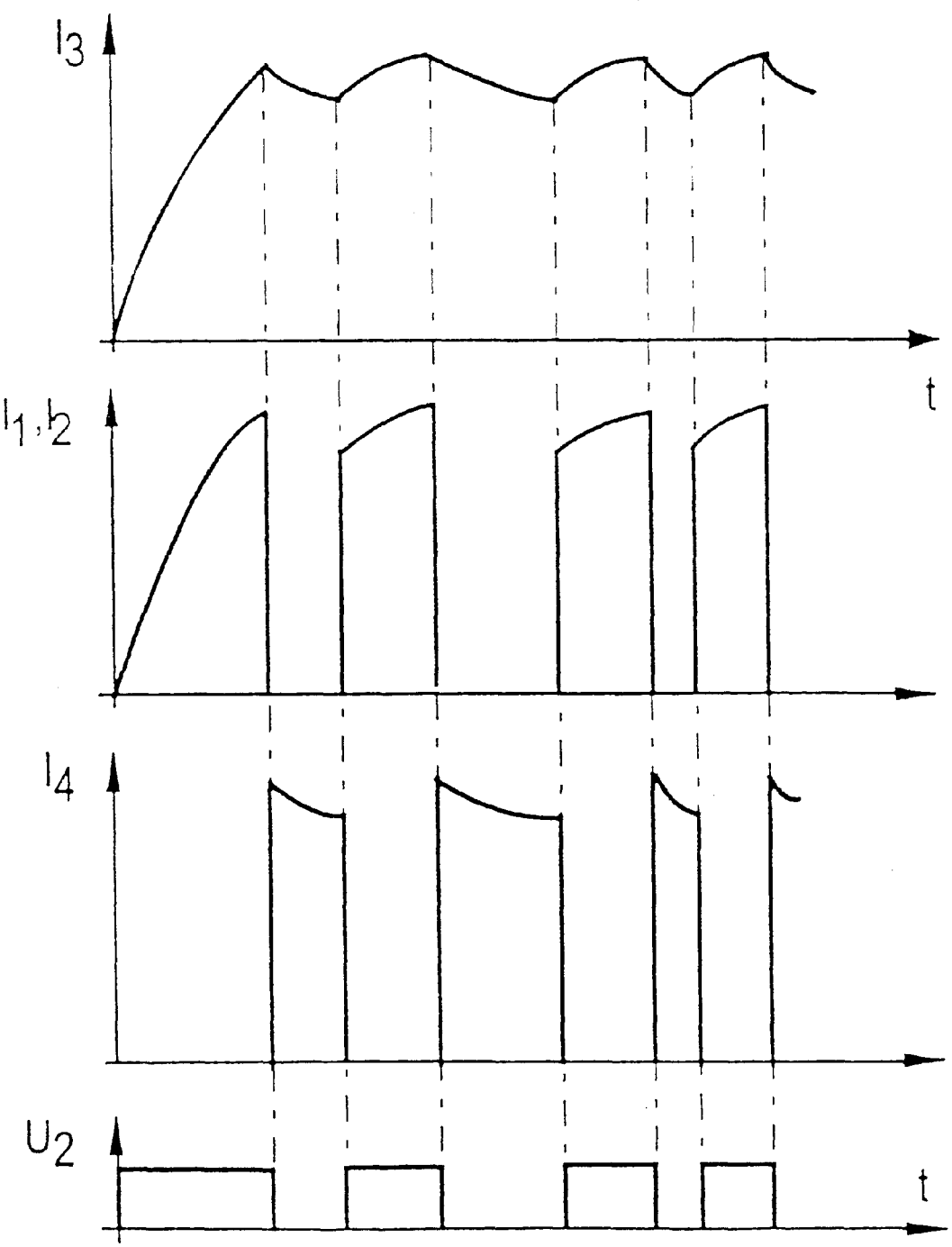

CIRCUIT CONFIGURATION WITH REDUCED EMI

BACKGROUND OF THE INVENTION

FIELD OF THE INVENTION

The present invention relates to a circuit configuration in a motor vehicle, having a semiconductor switch with a load section that is connected, on one hand, through a first supply line to a positive battery terminal and, on the other hand, through a second supply line to a load and a freewheeling diode, and a device for pulse-width modulation which controls the semiconductor switch.

Such a circuit configuration is basically used for pulse-width modulation in motors or valves. However, in motor vehicles such a configuration is only reluctantly used, and in the case of switched currents in the region of 20 A, no use is made of such circuits in the motor vehicle sector, because of the high risk of EMC (electromagnetic interference).

SUMMARY OF THE INVENTION

It is accordingly an object of the invention to provide a circuit configuration with reduced EMC, which overcomes the hereinbefore mentioned disadvantages of the heretofore-known devices of this general type and which permits the use of such pulse-width modulation even with currents in the range of 20 A and more.

With the foregoing and other objects in view there is provided, in accordance with the invention, a circuit configuration in a motor vehicle having a battery with a positive battery terminal, comprising a semiconductor switch having a load section; a pulse-width modulation device controlling the semiconductor switch; a first supply line connected between the load section of the semiconductor switch and the positive battery terminal; a second supply line connected to the load section of the semiconductor switch; a load and a freewheeling diode connected to the second supply line and defining a portion of the second supply line between the semiconductor switch and the freewheeling diode and a remainder of the second supply line leading to the load; and the semiconductor switch and the freewheeling diode disposed as close as possible to the positive battery terminal, for shortening the first supply line and the portion of the second supply line relative to the remainder of the second supply.

The invention utilizes the fact that only a current with a relatively low ripple flows in the region of the supply lead between the freewheeling diode and the load. Since the current is important for the EMI, the invention therefore proposes to mount the semiconductor switch and the freewheeling diode as close as possible to the battery.

In accordance with another feature of the invention, the semiconductor switch and the freewheeling diode are part of the battery terminal, thus ensuring the most optimum shortening of the supply lead to the semiconductor switch and the freewheeling diode.

In accordance with a concomitant feature of the invention, a plurality of semiconductor switches and freewheeling diodes are accommodated in a distributor box which is mounted as close as possible to the battery or at or on the battery.

Other features which are considered as characteristic for the invention are set forth in the appended claims.

Although the invention is illustrated and described herein as embodied in a circuit configuration with reduced EMI, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic and block diagram of a pulse-width modulation circuit configuration; and FIG. 2 is a group of graphs showing time characteristics of currents and voltages indicated in FIG. 1.

DESCRIPTION OF THE PREFERRED EMBODIMENTS

Referring now to the figures of the drawings in detail and first, particularly, to FIG. 1 thereof, there is seen a motor vehicle battery which has positive and negative poles and is represented by reference numeral 1. The positive pole is connected through a first supply line or lead to a first terminal of a controllable semiconductor switch 3. The controllable semiconductor switch 3 is symbolically represented in this case as an intelligent semiconductor switch which can, for example, have overtemperature protection or overload protection, etc. The intelligent semiconductor switch 3 is driven by a pulse-width modulation control circuit 2. A second terminal of the intelligent semiconductor switch 3 is connected through a second supply line or lead to a load, in this case a motor 5, for example. A freewheeling diode 4 is connected at a node 10 in parallel with the motor 5 which has an inductance 6. A portion of the second supply line is disposed between the semiconductor switch 3 and the freewheeling diode 4 and a remainder of the second supply line is disposed between the motor 5 and the freewheeling diode 4.

In the case of low EMI, such a configuration should have a semiconductor switch with "soft" control edges, in order to produce few harmonics.

The time characteristics of currents and voltages indicated in FIG. 1 are explained in more detail with the aid of FIG. 2. Reference symbol $U_2$, which is shown in the bottom diagram of in FIG. 2, is a voltage characteristic of a drive signal of the pulse-width modulation control 2. The semiconductor switch 3 is switched on or off digitally by this signal. As a result, a current $I_1$, which is represented in the second diagram from the top in FIG. 2, flows in the supply lead between the battery 1 and the semiconductor switch 3. The same current, which is indicated by reference symbol $I_2$, flows in the line between the semiconductor switch 3 and the freewheeling diode 4. It is seen that extreme current step ranges are produced in this case, and these are mainly responsible for strong EMI. A current $I_4$ which is shown in the second diagram from the bottom of FIG. 2 flows through the diode 4. The current $I_4$ flows through the freewheeling diode 4 and the motor 5 as a freewheeling current in blanking intervals. Reference symbol $I_3$ represents a current which flows on the line between the freewheeling diode 4 and the motor 5. It is seen from the top diagram in FIG. 2 that this current $I_3$ has a relatively low ripple, while the currents $I_1$, $I_2$ and $I_4$ make extreme current step changes.

If the semiconductor switch 3 and the diode 4 are integrated in the motor, although there is virtually a direct voltage on the long lines between the battery 1 and the semiconductor switch 3, the current step changes on this line are extreme. Very large EMI are to be expected as a result. A remedy can be provided in this case only by storage elements such as capacitors or inductors directly at the switch. However, those additional components must likewise have large dimensions in the case of high currents and are thus undesirable and expensive.

According to the invention, the switch 3 and the freewheeling diode 4 are accommodated very close to the battery 1. As a result, the supply leads having the currents $I_1$, $I_2$ and $I_4$ with the large current step changes are kept short. It is then only the current $I_3$, with a low ripple, which flows on the long line between the freewheeling diode 4 and the motor 5, and only the voltage on this line makes large step changes. The EMI is substantially reduced by this measure. Additional filter elements can thus largely be omitted.

In addition, this concept has the advantage that the line to the motor can be protected by the semiconductor switch as a substitute fuse. This means that a fuse is not required in this case, and the cross-section of the line to the motor can be optimized.

The configuration according to the invention including a semiconductor switch and a diode can preferably be integrated into a battery connecting terminal. The shortest supply leads are ensured in this way.

Should the number of two such semiconductor switches with diodes become too large for integration into a battery terminal to be practicable any longer, a multiplicity of configurations according to the invention can also be accommodated in a distributor box which is mounted directly on or at the battery.

I claim:

1. In a motor vehicle having a battery with a positive battery terminal, a circuit configuration, comprising:
   a semiconductor switch having a first terminal and a second terminal;
   a pulse-width modulation device controlling said semiconductor switch;
   a first supply line connected between said first terminal of said semiconductor switch and the positive battery terminal;
   a second supply line connected to said second terminal of said semiconductor switch;
   a load and a freewheeling diode connected to said second supply line and defining a portion of said second supply line between said semiconductor switch and said freewheeling diode and a remainder of said second supply line leading to said load; and
   said semiconductor switch and said freewheeling diode disposed as close as possible to the positive battery terminal, for shortening said first supply line and said portion of said second supply line relative to said remainder of said second supply.

2. The circuit configuration according to claim 1, wherein said semiconductor switch and said freewheeling diode are integrated in the battery terminal.

3. The circuit configuration according to claim 1, wherein said semiconductor switch and said freewheeling diode are accommodated in a distributor box at the battery.

4. The circuit configuration according to claim 1, wherein said semiconductor switch and said freewheeling diode are accommodated in a distributor box on the battery.

\* \* \* \* \*